(12) United States Patent
Moon et al.

(10) Patent No.: US 6,617,554 B2
(45) Date of Patent: Sep. 9, 2003

(54) COUNTER-TOP ELECTRIC COOKER HAVING A SAFETY SHUT-OFF SWITCH

(75) Inventors: Jung S. Moon, Buffalo Grove, IL (US); Heejin Lee, Gurnee, IL (US); Rong Liu, Wheeling, IL (US); Kitak Chae, Seoul (KR)

(73) Assignee: Hearthware Home Products, Inc., Gurnee, IL (US)

( * ) Notice: Subject to any disclaimer, the term of this patent is extended or adjusted under 35 U.S.C. 154(b) by 0 days.

(21) Appl. No.: 09/966,805

(22) Filed: Sep. 28, 2001

(65) Prior Publication Data

US 2003/0062360 A1 Apr. 3, 2003

(51) Int. Cl.[7] .................................................. H05B 1/02
(52) U.S. Cl. ........................ 219/481; 219/494; 219/518; 219/508; 99/325
(58) Field of Search ................................ 219/481, 482, 219/497, 508, 505, 518, 494, 386–403; 99/421 R, 421 A, 330–341, 325; 126/21 A, 21 R

(56) References Cited

U.S. PATENT DOCUMENTS

| | | | |
|---|---|---|---|
| 2,274,325 A | | 2/1942 | Ford |
| 4,913,047 A | | 4/1990 | Burley |
| 5,107,097 A | * | 4/1992 | Negandhi et al. ........... 219/400 |
| 5,466,912 A | * | 11/1995 | Dornbush et al. .......... 219/400 |
| 5,513,558 A | * | 5/1996 | Erickson et al. ............... 99/330 |
| 5,520,096 A | * | 5/1996 | Dornbush et al. ............ 99/340 |
| 5,845,563 A | * | 12/1998 | Haring et al. ................. 99/419 |
| 5,880,436 A | | 3/1999 | Keogh |
| 6,201,217 B1 | | 3/2001 | Moon et al. |

* cited by examiner

*Primary Examiner*—Mark Paschall
(74) *Attorney, Agent, or Firm*—Bell, Boyd & Lloyd, LLC

(57) ABSTRACT

A counter-top electric oven includes a base, an oven housing supported on the base, and a power head detachably connected to the oven housing. The power head includes a heating unit for generating and directing heat into the oven housing. At least one handle is formed on the power head, and a power interrupting device is operatively provided in the handle for disconnecting power to the power head. The power interrupting device is activated when the handle is grasped by a user.

20 Claims, 12 Drawing Sheets

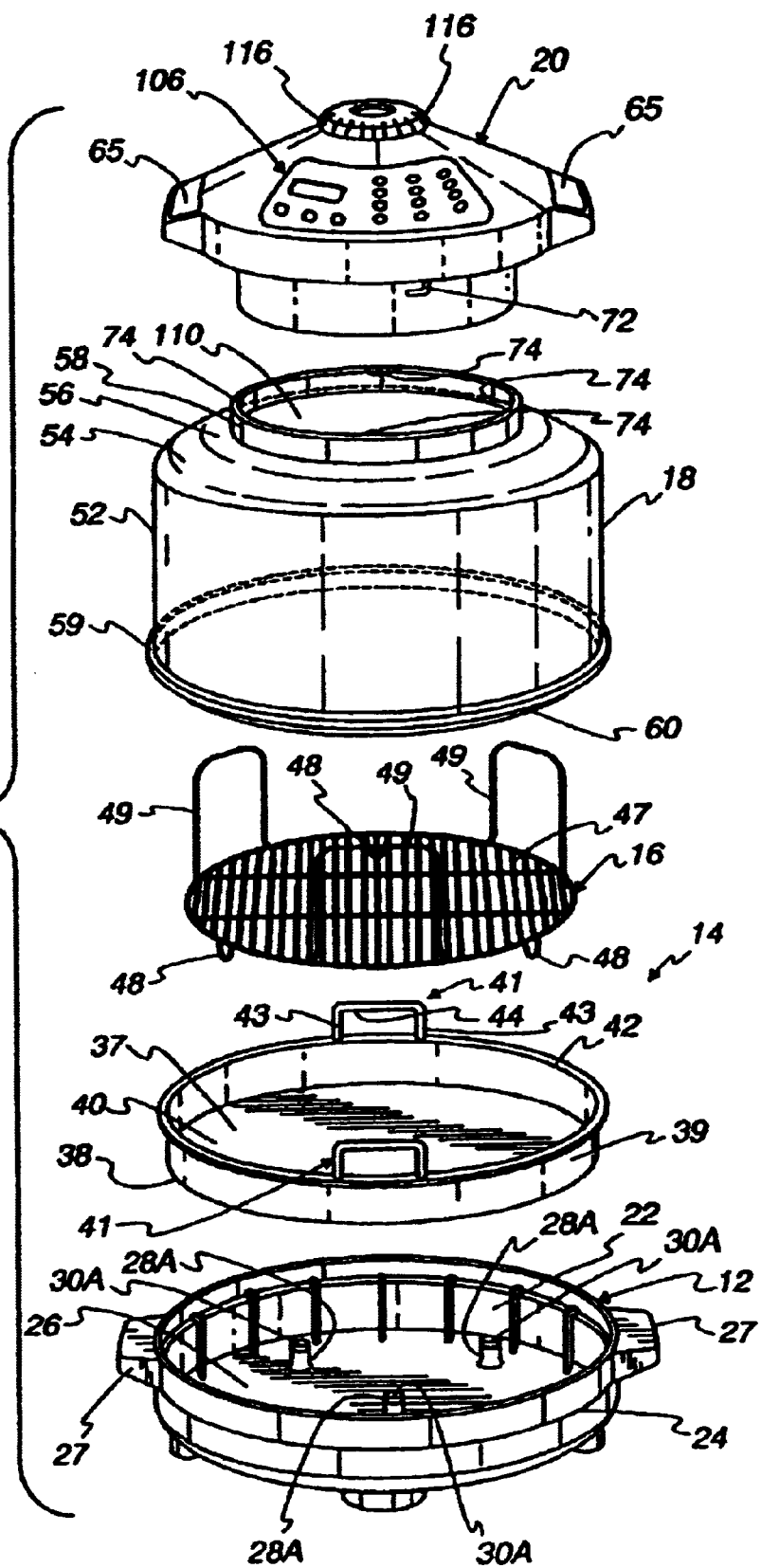

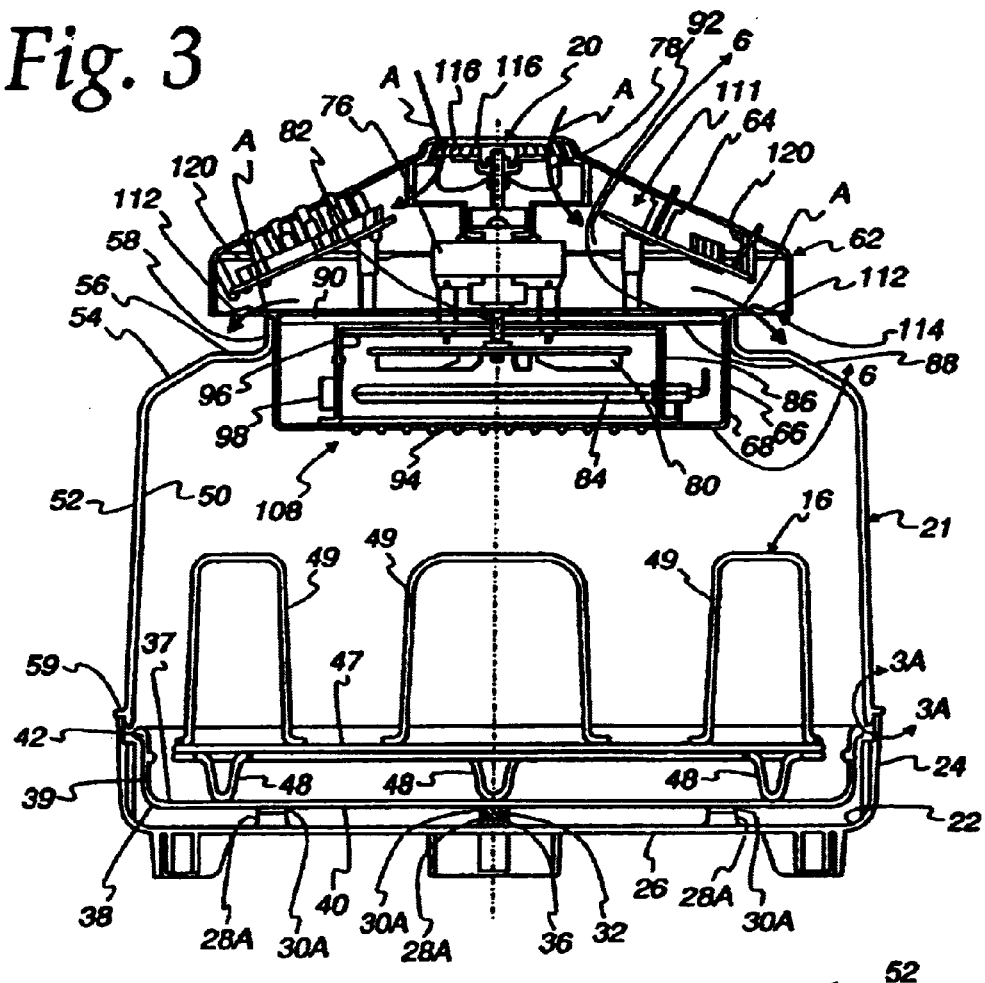
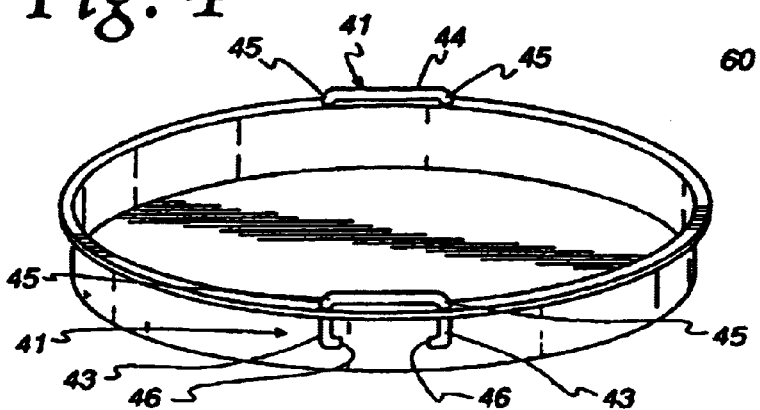

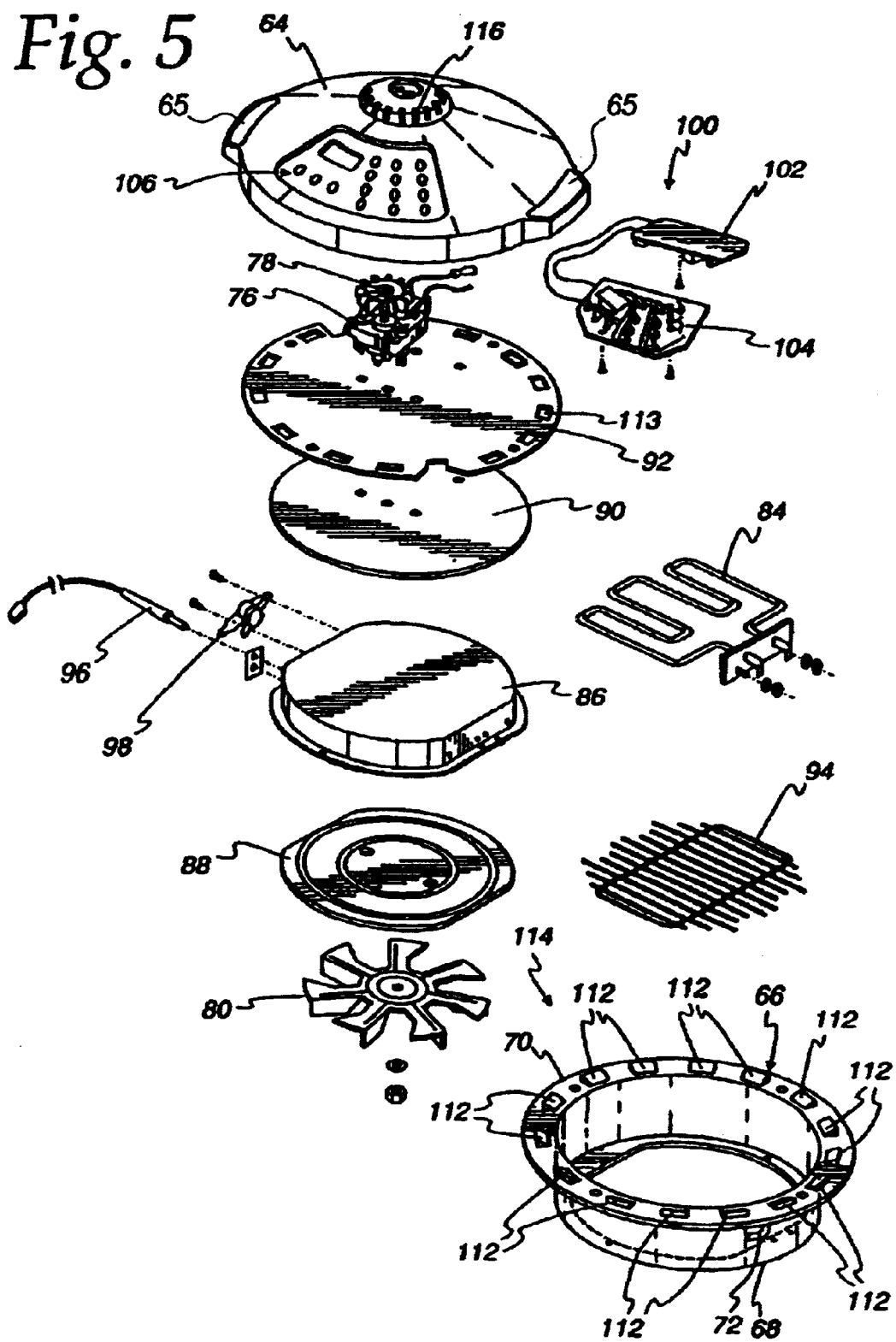

COUNTER-TOP ELECTRIC COOKER HAVING A SAFETY SHUT-OFF SWITCH

FIELD OF THE INVENTION

This invention relates to electric ovens, and in particular to a counter-top electric cook oven having an automatic safety shut-off mechanism.

BACKGROUND OF THE INVENTION

Counter-top electric ovens are known in the art. In comparison to conventional ovens, counter-top electric ovens typically offer the advantage of being less bulky and having quicker cooking times. It is common for counter-top ovens to include a power head having a heating unit that is used to heat the cooking enclosure. To reduce the cooking time, counter-top electric ovens typically will rely on a hot air stream that is cycloned around the food by a high speed fan associated with the electric heating element, or by utilizing an infrared heating element in combination with a relatively low speed fan that generates sufficient air circulation in the oven to ensure a relatively uniform temperature distribution in the oven.

Typically, the power head is removably locked to an upper portion of the cooking enclosure. The interior of the cooking enclosure is accessed by manually lifting the power head, which is typically provided with a pair of handles, thereby separating the upper portion of the cooking enclosure from the remainder of the cooking enclosure. The ovens generally include a power switch and/or a pause switch that must be set by a user to shut off or interrupt power to the oven before the interior of the cooking enclosure can be a accessed by the user, if the oven is in operation A problem associated with the known counter-top ovens is that the ovens cannot be shut off unless a user deactivates the power switch or activates the pause switch (if provided). Thus, if the user fails to deactivate the power switch or activate the pause switch, it is possible for the user to remove the upper portion of the cooking enclosure from the remainder of the cooking enclosure while the power head is still generating heat. This dangerously exposes the user to the heat from the power head and also poses a fire hazard.

SUMMARY OF THE INVENTION

The present invention is directed to a counter-top oven that has a power head for providing hot air to the interior of the cooking enclosure. A safety switch is built into each of the handles provided on the power head. In this manner, when the oven user grabs the handles in an attempt to access the interior of the cooking enclosure, the safety switch is activated and interrupts power to the power head.

BRIEF DESCRIPTION OF THE DRAWINGS

FIG. 2 is an exploded view of the oven shown in FIG. 1;

FIG. 3 is a somewhat diagrammatic section view of the oven shown in FIG. 1;

FIG. 3A is an enlarged view of the area indicated by lines 3A—3A in FIG. 3;

FIG. 4 is a perspective view of an oven pan of the oven shown in FIG. 1;

FIG. 5 is an exploded view of a power head of the oven shown in FIG. 1;

DETAILED DESCRIPTION OF THE INVENTION

Figure 1:
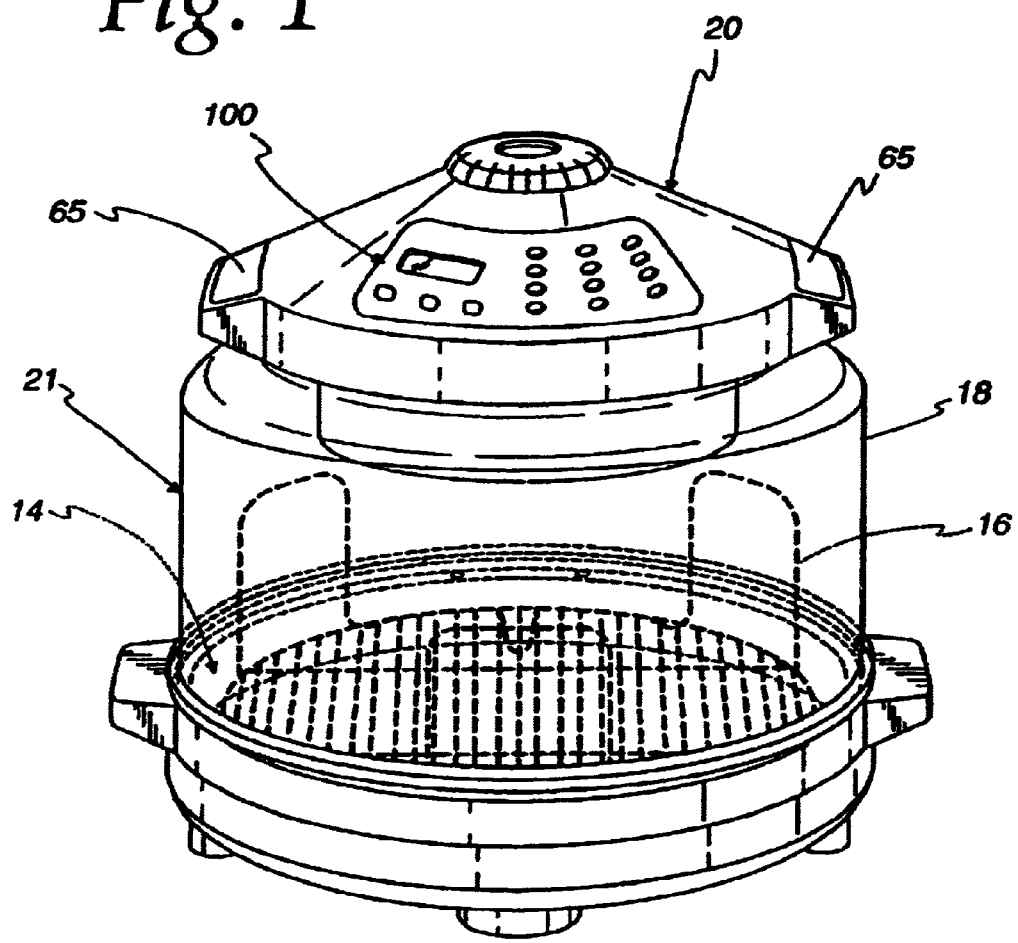
FIG. 1 is a perspective view of a counter-top infrared electric oven embodying the features of the invention.

Broadly stated, the present invention is directed to a counter-top electric oven including a base, an oven housing supported on the base, and a power head detachably connected to the oven housing. The power head includes a heating unit for generating and directing heat into the oven housing. At least one handle is formed on the power head, and a power interrupting device is operatively provided in the handle for disconnecting power to the power head. The power interrupting device is activated when the handle is grasped by a user.

In accordance with another aspect of the present invention, a power head for a counter-top oven is configured and adapted to be detachably attached to a cooking enclosure of the oven. The power head includes a housing having a top side and a bottom side, and a heating unit provided in the housing for generating and directing heat from the bottom side into the cooking enclosure. At least one handle is formed on the housing for attaching and detaching the power head onto and from the cooking enclosure. A power interrupting device is provided in the handle for disconnecting power to the heating unit.

An exemplary embodiment of a counter-top electric oven made according to the invention is described herein and is illustrated in the drawings in connection with an infrared counter-top oven. However, it should be understood that many features of the invention may find utility in other types of counter-top electric cooking ovens, including those using cyclonic air flow in combination with simple resistance electric heating elements. Accordingly, no limitation is intended to use in connection with an infrared heating element except insofar as expressly stated in the appended claims.

With reference to FIGS. 1 and 2, a counter-top electric oven 10 includes a base 12, an oven pan 14 supported by the base 12, a cooking rack 16 supported by the oven pan 14, a generally cylindrical, a transparent oven housing 18 supported by the base 12, and a power head 20 supported on the oven housing 18 and detachably connected to the oven housing 10. Together, the oven pan and the oven housing 18 define a cooking enclosure 21 with the oven 10 is in the assembled state shown in FIG. 1.

As best seen in FIGS. 2 and 3, the base 12 has an interior surface 22 defined by a generally cylindrical side wall 24 and a planar bottom 26. A pair of handles 27 extend from the cylindrical side wall 24 to allow a user to move the oven 10 from one location to another. The interior surface 22 surrounds the oven pan 14 and is spaced from the oven pan 14 by an air gap. The base 12 further includes one or more supports 28 for the oven pan 14 and one or more thermal insulators 30 between the one or more supports 28 and the oven pan 14 to prevent overheating of the base 12 by the heat from the oven pan 14. In the preferred embodiment shown in FIGS. 2 and 3, the or more supports 28 are provided in the form of three cylindrical pillars 28A, and the one or more thermal insulating spacers 30 are provided in the form of three cylindrical spacers 30A, each supported by one of the pillars 28A. As seen in the section view of the spacer 30A and pillar 28A in FIG. 3, each of the spacers 30A includes a cylindrical stub 32 that is engaged in a mating hole 36 in each pillar 28A to retain each of the spacers 30A to the respective pillar 28A. While it is preferred that the cross-sections of the spacers 30A and the pillars 28A be generally circular, it should be understood that the invention contemplates non-circular cross-sections, such as, for example, triangular, oval, square, rectangular, trapezoidal, hexagonal, etc. The oven pan 14 is supported on the insulators 30 to maintain the air gap between the interior surface 22 and the cooking pan 14 and to prevent overheating of the base 12, including the handles 27. Preferably, the plastic base 12 is made from a suitable polycarbonate material and the thermal insulators 30 are made from a suitable silicone rubber insulating material.

The metallic oven pan 14 includes an interior surface and an exterior surface 38 defined by a cylindrical side wall 39 and a planar bottom 40. Preferably the oven pan 14 is a one piece construction made of aluminum plate with a suitable nonstick PTFE coating on the interior surface 37. A pair of retractable handles 41 are mounted to a lip 42 that defines an outer periphery of the oven pan 14. The handles 41 are mounted to the lip 42 for movement between a first position, shown in FIG. 2, where the handles 41 are extended from the lip 42 so that a user may grasp the handles 41 to remove the pan 14 from the base 12, and a second position, shown in FIG. 4, where the handles 41 are retracted toward lip 42 to allow the oven housing 18 to be positioned above the oven pan 14, as shown in FIG. 3, without interfering with the handles 41. As best seen in FIG. 4, each of the handles 41 has a pair of legs 43 extending from a grasping member 44. Each of the legs 43 are received in a vertical guide hole 45 formed in the lip 42 to guide the handles 41 between the first and second positions. Each of the legs terminate in a tab 46 that engages the lip 42 with the handle 41 in the first position. Preferably, the handles are made from a unitary piece of metallic wire that is bent to form the grasping member, the legs 43, and the tabs 46.

The cooking rack 16 includes a planar grid 47 for supporting food items that are being cooked, a first set of loop projections 48 extending in one direction from the plane of the 47 and a second set of loop projections 49 extending in the opposite direction from the plane of the grid 47. The projections 48 can be used to support the grid to provide a first cooking height for food items supported by the grid 47, while the projections 49 can be used to support the grid 47 to provide a second cooking height for the grid 47. Preferably, the cooking rack 16 is made from 304 stainless steel with a suitable non-stick PTFE coating.

As best seen in FIG. 3, the oven housing 18 includes an interior surface 50 defined by a generally cylindrical side wall 52 that blends into a generally conical shaped side wall 54 which in turn blends into a planar upper wall 56 which finally blends into a generally cylindrical ring 58. An annular lip 59 is formed on the outer surface of the wall 52 and serves to support the oven housing 18 on the side wall 24 of the base 12. A portion 60 of the wall 52 that extends below the lip 59 cooperates with the side wall 24 of the base 12 to restrict the leakage of hot gases, such as steam, from the cooking enclosure 21. As best seen in FIG. 3A, the portion 60 includes an annular lead-in chamfer or relief 61 that serves to guide the portion 60 into the base 12, thereby easing the engagement of the oven housing 18 to the base 12 and preventing the mislocation of housing 18 relative to the base 12, i.e., the housing 18 can be inserted into the base 12 while being tilted somewhat relative to vertical. Preferably, the oven housing 18 is formed from a suitable transparent polycarbonate material.

As best seen in FIGS. 3 and 5, the power head 20 includes an exterior housing assembly 62. The assembly 62 includes a domed shape upper housing 64 having a pair of handles 65 (best shown in FIG. 5), and a lower housing 66 including a cylindrical wall portion 66 and an annular flange 70. As seen in FIG. 2, four equally spaced lands 72 (only one shown) are raised from the cylindrical wall 66 to engage a plurality of ramped tabs 74 formed on the ring 58 of the housing 18 to detachably connect the power head 20 and the housing 18. The power head 20 further includes a motor 76 for driving a cooling fan 78 and an oven fan 80 via a common shaft 82, an infrared electric heating element 84, a heater/fan housing 86, a radiation plate 88 mounted to an interior surface of the heater housing 86, a glass fiber thermal insulator 90 mounted between the heater housing 86 and the motor 76, a mica sheet 92 mounted between the upper housing 64 and the lower housing 66, a protective grid 94, a thermistor 96, a thermostat 98, and a controller 100 including a pair of control boards 102 and 164 for controlling the heating element 84 and the motor 76 in response to signals from the thermistor 96 and command signals input into a control panel 106 by a user.

Preferably, the fan 78 is made of a suitable plastic material, while the fan 80 and the radiation plate 88 are made of aluminum plate in order to reflect the infrared energy from the heater 84 down toward the interior of the cooking enclosure 19. It is also preferred that the motor 76 drive the fans 78 and 80 at a speed in the range of 2500 rpm, which should provide an adequate air flow from the fan 80 to create a relatively even temperature throughout the cooking enclosure 21 and to speed the cooking of food by convection to supplement the infrared cooking, without generating the high speed air motion associated with some cyclonic electric countertop ovens. Another benefit of the relatively low speed air flow created by the fan 80 is that it helps to maintain the hot surfaces of the oven 10 in a temperature range that will tend to emit infrared radiation and limits the decrease in emissivity of the nonmetal materials of the oven 10.

It is preferred that the heating element 84 be made of an incoloy 840 material coated with a G-1500 (CRC 1500) ceramic coating having a coating thickness of 20±5 μm with the main components of the coating material being $SiO_2$, TiO$_2$, and Al$_2$O$_3$, with an inorganic pigment, mainly Si—O. The ceramic coating increases the emissive power of the heating element and shifts the emission spectrum to the infrared range. With this coating, the heating element 84 is capable of generating approximately 98% or more of its heat radiation in the infrared range. A sol-gel coating method is used for coating the ceramic material firmly onto the incoloy 840 material. The grid 94 is preferably made of 304 stainless steel or from any suitable PTFE coated metallic material. Preferably, the upper housing is made from a suitable polycarbonate material and the lower housing and the heater housing are made from zinc plated steel or steel coated with a suitable non-stick PTFE coating.

Together, the cylindrical wall portion 68 of the lower housing 66, the heater housing 86, the radiation plate 88, the fan 80, and the heating element 84 define a heating unit 108 that extends into the cooking enclosure 21 through an opening 110 defined by the cylindrical portion 58 of the housing 18. Together, the upper housing 64 and the mica sheet 92 define a fan chamber 111 that is thermally insulated from the interior of the cooking enclosure 21 by the mica sheet 92, the glass fiber insulator 90, the heater housing 86, the radiation plate 88, and the lower housing 66. As best seen in FIGS. 3 and 5, a plurality of cooling air outlets 112 are formed in the annular flange 70 of the lower housing 66. Cut-outs 113 are provided in the mica sheet 92 to prevent interference between the outlets 112 and the mica sheet 92 and to allow a cooling air flow to pass through the mica sheet 92 to the outlets 112. Preferably, the outlets 112 are equally circumferentially spaced around the flange 70.

Together the flange 70 and the outlets 112 define a cooling manifold 114 that surrounds the opening 110 of the housing 18 and faces the surface 56 outside of the cooking enclosure 21. The cooling fan 78 actively cools the fan chamber 111 and the walls 52, 54, 56 and 58 of the housing 18 by drawing a cooling air flow through a plurality of inlet openings formed in the upper housing 64 and forcing the cooling air to exit through the outlets 112, which direct the cooling air flow toward the surface 56 of the housing 18 to cool the housing 18, as indicated by arrows A.

Figure 6:
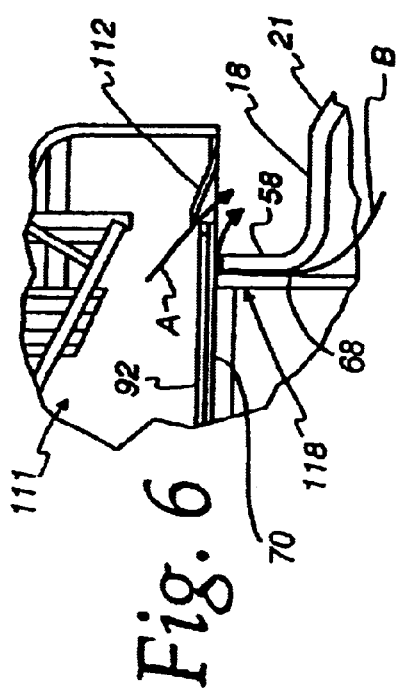
FIG. 6 is an enlarged view of the area indicated by lines 6—6 in FIG. 3.

As best seen in FIG. 6, the wall 68 and the flange 70 are spaced from the cylindrical ring 58 of the housing 18 by the tabs 74 to define a hot gas vent 118 that surrounds the heating unit 108 between the heating unit 108 and the outlets 112 to vent hot gas, such as steam, from the inside of the cooking enclosure 21 for mixture with the cooling air flow from the air outlets 112, as shown by the arrow B.

The control boards 102 and 104 are spaced from the interior surface of the upper housing 64 by a plurality of mount supports 120 to allow the cooling air flow to pass over both sides of the control boards 102 and 104 as it circulates around the fan chamber 111 before exiting through the outlets 112, thereby enhancing the cooling of the electronics on the control boards 102 and 104.

Figure 7:
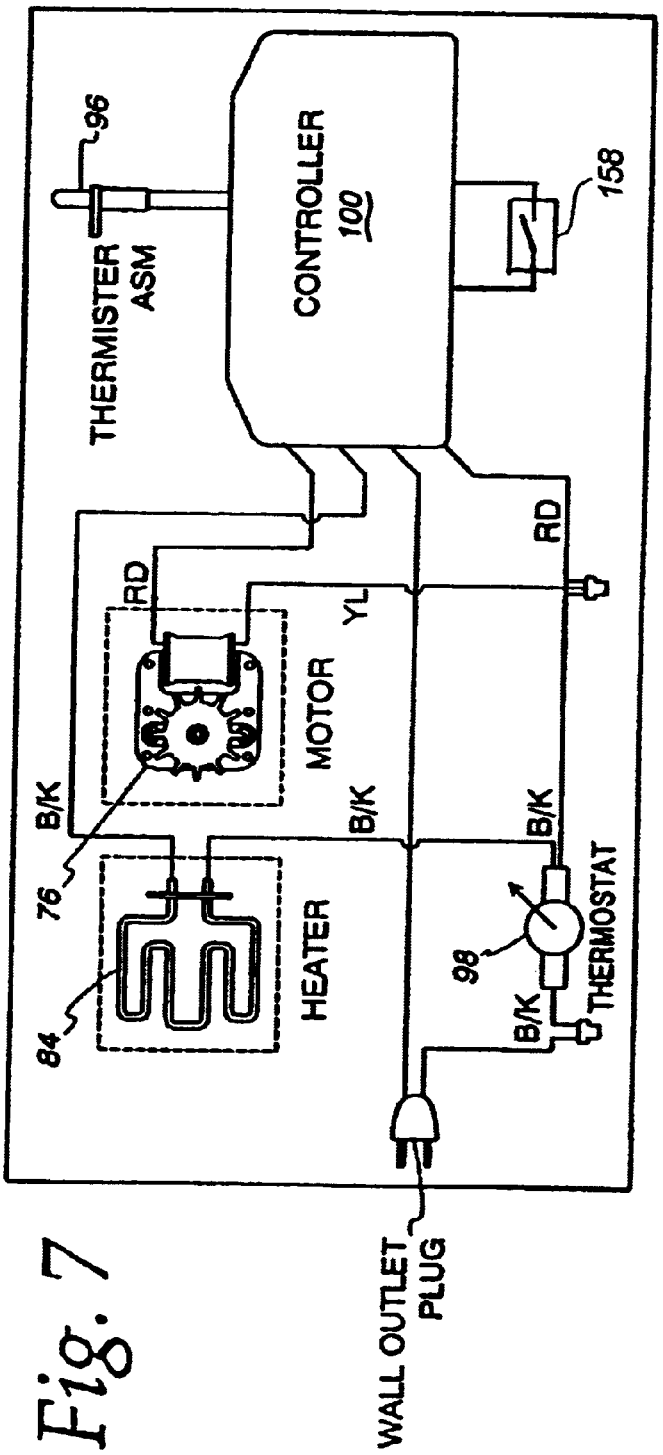
FIG. 7 is a diagrammatic representation of the operating components of the oven shown in FIG. 1.

As best seen in FIG. 7, the controller 100 is connected to the motor 76 and the heating element 84 to control the flow of electric power to the motor 76 and the heating element 84 in response to signals from the thermistor 96 and command signals input by the control panel 106 by a user. The controller is configured to selectively power the heating element at a number of power levels P from a minimum power to a maximum power. At each power increment P. the controller 100 powers the heating element when the thermistor 96 indicates that the temperature in the cooking enclosure 21 has fallen below a low temperature set point associated with the particular power level P. The controller 100 then terminates power to the heating element 84 when the temperature indicated by the thermistor 96 exceeds a high temperature set point associated with the particular power level P. The controller provides power continuously to the motor 76 during the heating operations regardless of the power level selected.

Figure 8:
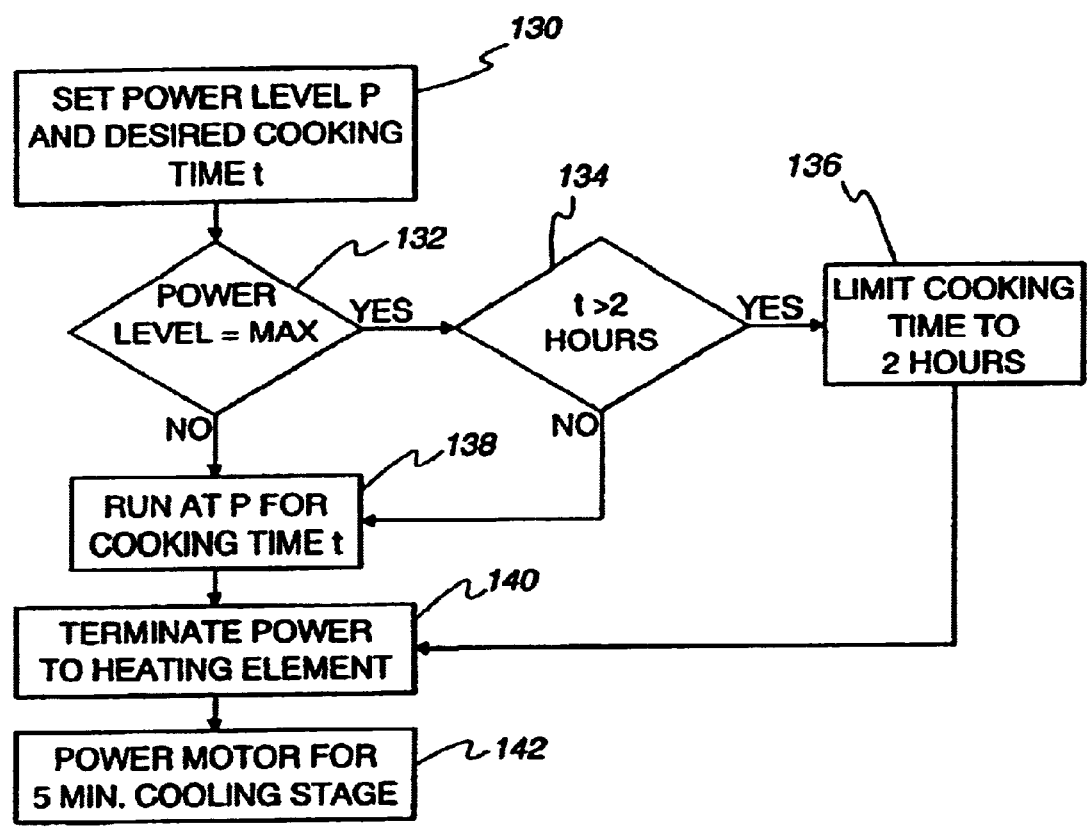
FIG. 8 is a flow chart illustrating selected operational features of the oven shown in FIG. 1.

As best seen in FIG. 8, the controller is configured to limit the cooking time at the maximum power setting to two hours to prevent overheating of the oven 100. More specifically, after a user sets the power level P and enters the desired cook time t at block 130, it is determined at 132 whether the power has been set to the maximum power level. If the power is set to maximum, it is determined at 134 whether the desired cooking time exceeds two hours. If the desired cooking time exceeds two hours, the cooking time is automatically limited to two hours by the controller 100 at 136. If the desired cooking time is less than two hours, or if the power level P is not set to maximum, the controller is configured to run the heating element 84 and the motor 76 at the power level P and for the desired cooking time t, as shown at block 138.

Figure 9A:
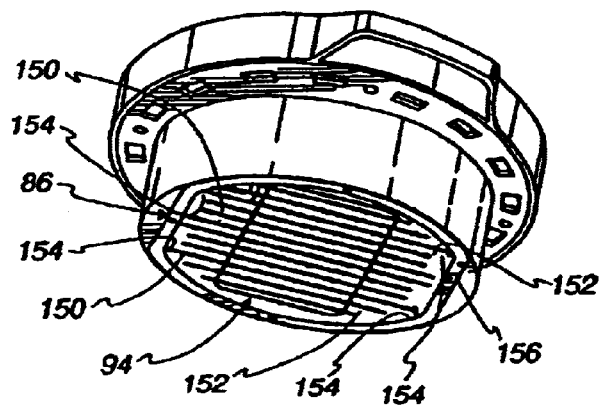
FIGS. 9A–D are perspective views illustrating the mounting and the removal of a protective grid of the oven shown in FIG. 1.
Figure 9B:
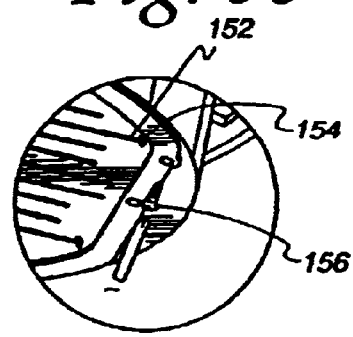
Figure 9C:
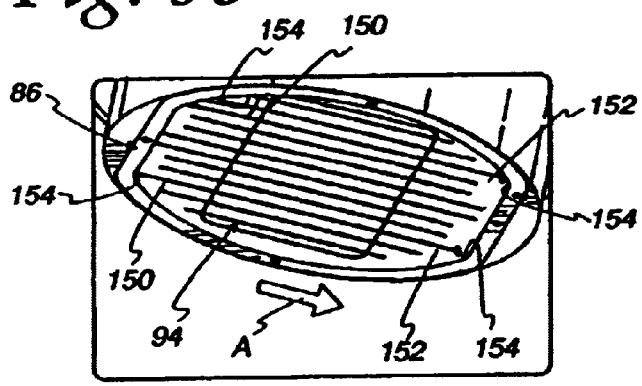
Figure 9D:
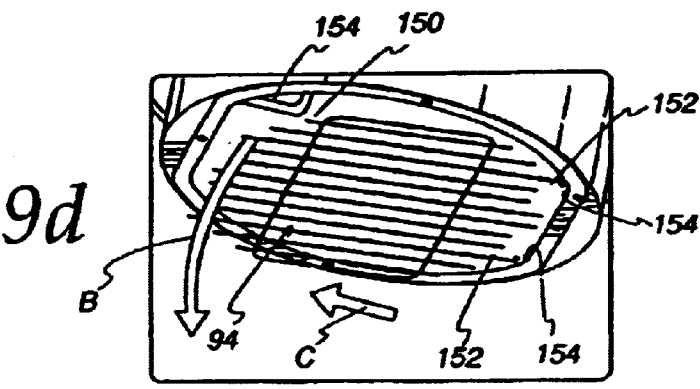

After the cooking time has expired, the controller 100 is configured to terminate power to the heating element 84 and to the motor 76. However, as an optional feature, after the cooking time has expired, the controller 100 can be configured to terminate power to the heating element 84 while providing power to the motor 76 for a five minute cooling stage, for example, as shown at 140 and 142. This may allow time for the hot gases in the cooking enclosure 21 to vent and to be cooled by the cooling air flow from the outlets 112, thereby preventing hot gases, such as steam from accumulating in the cooking enclosure 21 and/or the fan chamber 111 and also preventing the handles 65 from overheating As best seen in FIG. 9A, the protective grid 94 includes a first pair of legs 150 that are oppositely directed relative to a second pair of legs 152. As best seen in FIG. 9B, each of the legs 150, 152, is slidably received in a mating aperture 154 in the heater housing 86 to detachably mount the protective grid 94 to the heater housing 86. A fastener 156 is engaged with the heater housing 86 for movement between a first position shown in FIG. 9A where the fastener engages one of the legs 152 to restrict movement of the grid 94 relative to the heater housing 86 to prevent removal of the grid 94 from the heater housing 86, and a second position shown in FIG. 9B where the fastener is disengaged from the one leg 152 to allow removal of the grid 94 from the heater housing 86. Preferably, as seen in FIG. 9B, the fastener 156 is provided in the form of a threaded set screw that is threadably engaged with the housing 86, with the end of the set screw frictionally engaging the one leg 152 in the first position shown in FIG. 9A. In this regard, it should be noted that for the fastener to be in the second position it need not be completely removed from the housing 86 as shown in FIG. 9B, rather, the fastener 156 need only be positioned so that it is disengaged from the one leg 52 to allow movement of the grid 94 relative to the housing 86. As best seen in FIG. 9C, with the fastener 156 in the second position, the legs 152 can be slid in the apertures 154 to allow the grid 94 to move relative to the housing 86 in the direction of the legs 152, as indicated by Arrow A, to thereby remove the legs 150 from their mating apertures 154. Once the legs 150 are removed from their mating apertures 154, the grid 94 can be tilted downward as shown by the arrow B in FIG. 9D and then the grid 94 can be moved in the direction of the legs 150, as indicated by Arrow C, to thereby remove the legs 152 from their mating apertures 154 and thus, the grid 94 from the housing 86. Removal of the grid allows for cleaning of the heating element 84, the fan 80, the reflector plate 88, and the interior of the housing 86.

Figure 10:
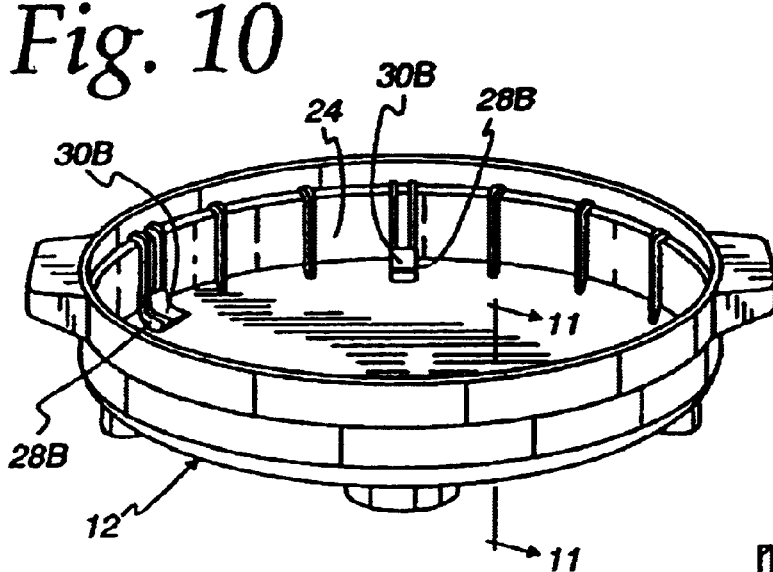
FIG. 10 is a perspective view of an optional embodiment of a base for the oven shown in FIG. 1
Figure 11:
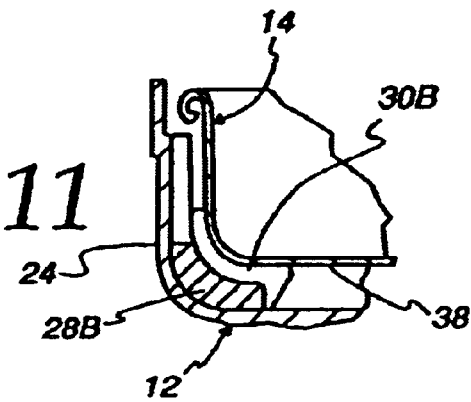
FIG. 11 is an enlarged, fragmentary section view taken substantially along line 11—11 in FIG. 10.

As best seen in FIGS. 10 and 11, in an optional embodiment of the base 12, the one or more supports 28 are provided in the form of three or more circumferentially spaced feet 28B that extend from the side wall 24 to underlie the oven pan 14, and the thermal insulators 30 are provided in the form of three or more thermal insulating spacers 30B, each supported by one of the feet 28B.

Figure 12:
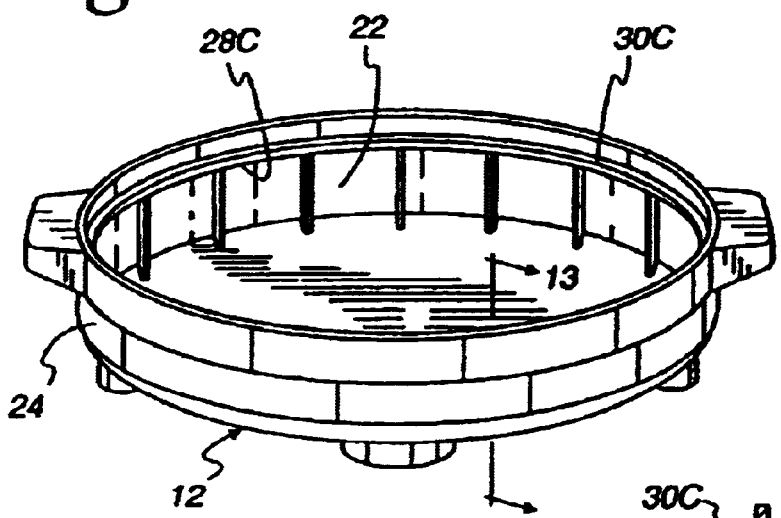
FIG. 12 is a perspective view of another optional embodiment of a base 10 for the oven shown in FIG. 1.
Figure 13:
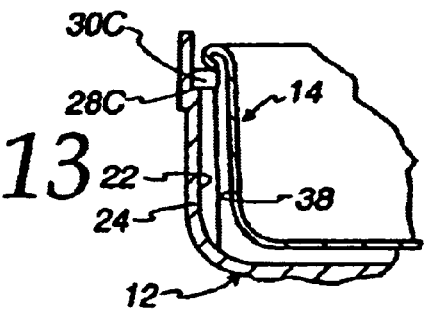
FIG. 13 is an enlarged, fragmentary section view taken substantially along line 13—13 in FIG. 12.

As best seen in FIGS. 12 and 13, in one optional embodiment of the base 12, the one or more supports 28 is provided in the form of an annular shoulder 28C formed on the interior surface 22 of the base 12, and the one or more insulators 30 are provided in the form of a thermal insulating ring 30C that is supported by the shoulder 28C.

Turning now to FIGS. 14–17 and in accordance with another aspect of the present invention, the counter-top electric oven 10 further includes a power interrupt device 158 incorporated into each of the handles 65 of the power head 20 (best shown in FIGS. 1 and 2). The power interrupt device 158 includes a micro-switch 160 provided and secured within the dome-shaped upper housing 64 so that a switch activation pin 162 extends outwardly in the direction of the handle 65 from a body 164 of the switch. The pin 162 is spring biased to protrude from the body 164 of the switch 160 in the deactivated state of the switch. The switch 160 is activated when the pin 162 is pressed into the body 164 of the switch. In the preferred embodiment, the micro switch 160 is a 15 amp, 125, 250 VAC switch. However, it will be obvious to those skilled in the art that many other types of switches are also suitable.

Figure 14:
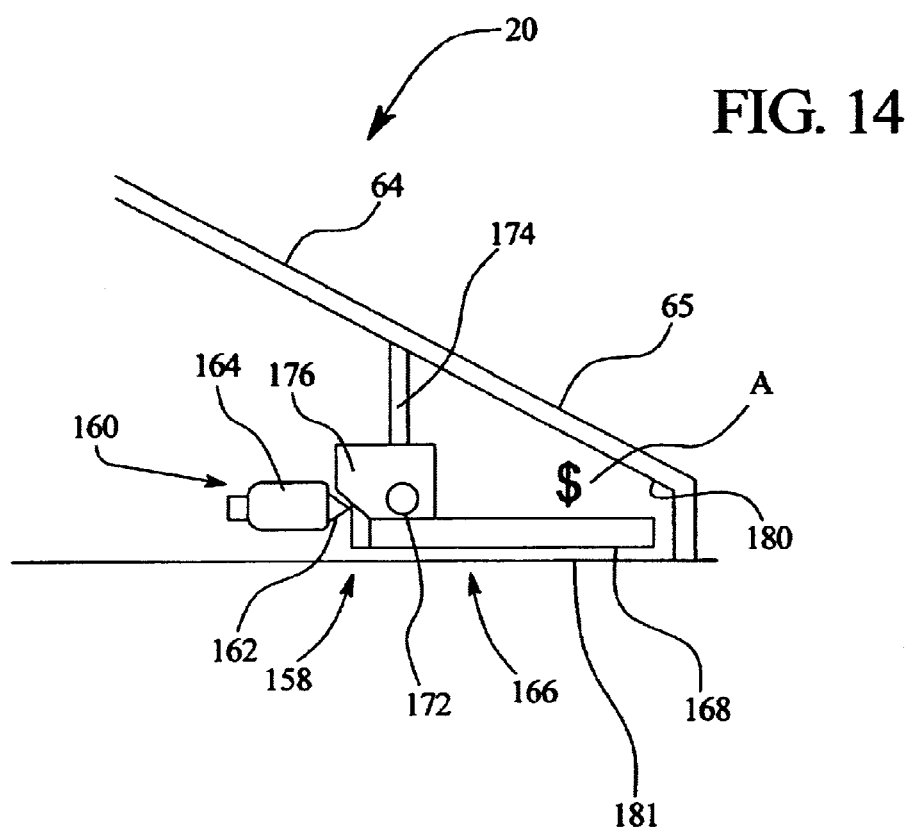
FIG. 14 is a fragmentary section view of a power interrupt device taken substantially along line 14—14 in FIG. 15.
Figure 15:
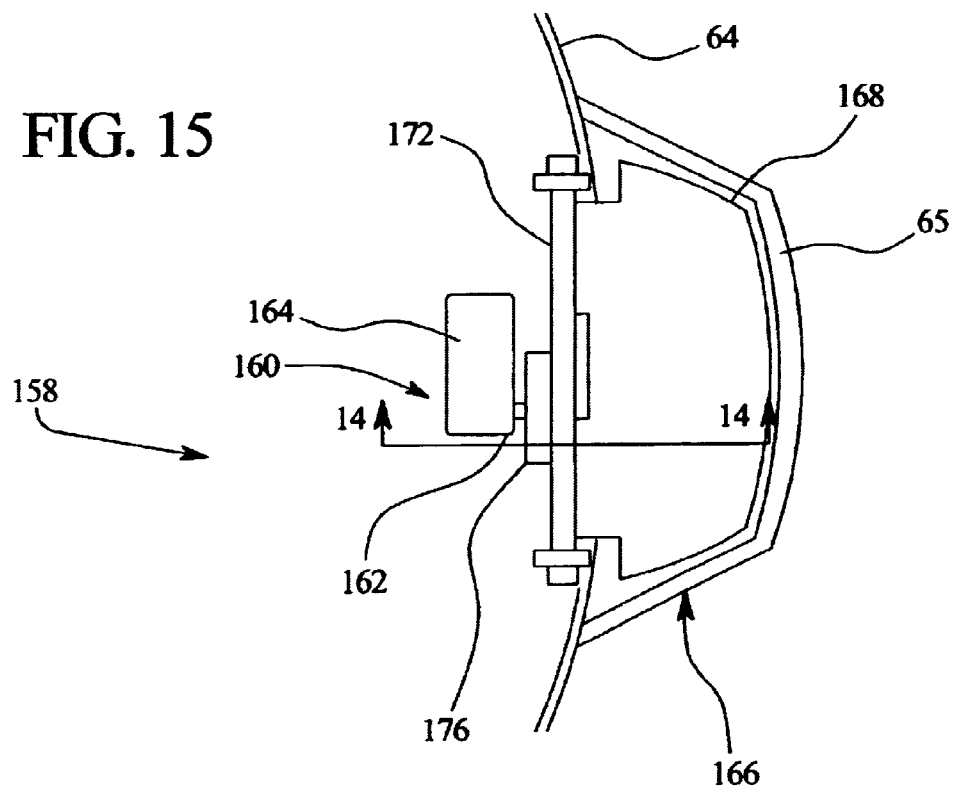
FIG. 15 is a bottom view of the power interrupt device of FIG. 14.
Figure 16:
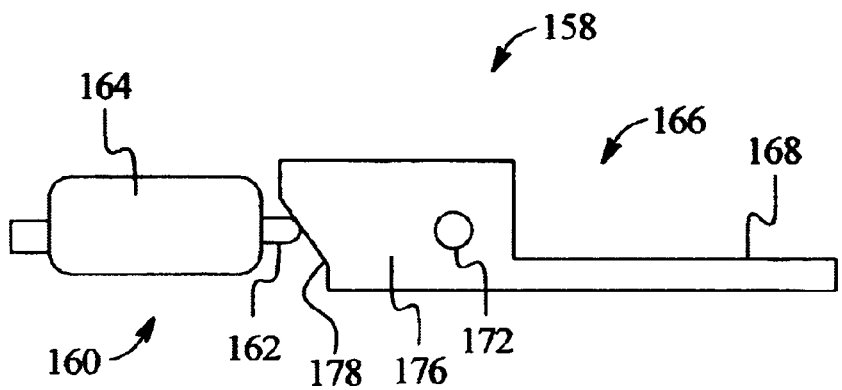
FIGS. 16 and 17 are enlarged view of a micro-switch and a lever mechanism (taken substantially along line 14—14 in FIG. 15) of the power interrupt device of FIG. 15.
Figure 17:
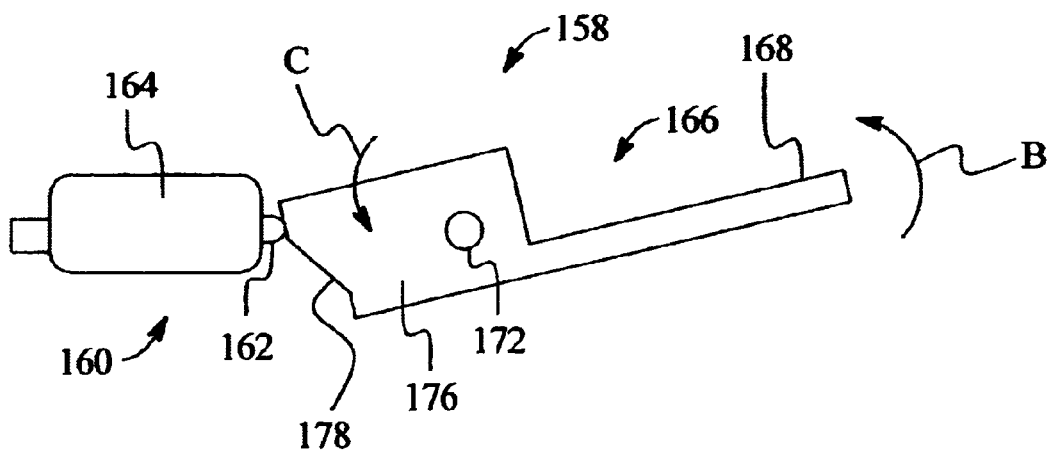

The power interrupt device 158 also includes a lever mechanism 166 having a pad portion 168 which is configured generally in the shape of the handle 65 of the power head 20 as seen from the bottom of the housing 64 (best shown in FIG. 15). The pad portion 168 is generally flat so that it is allowed to move in the vertical directions as shown by arrow 170 in FIG. 14. The vertical movement of the pad portion 168 is made possible by a cylindrical hinge 172 (best shown in FIG. 15) which is attached the pad portion 168 and is pivotably secured to a segment of a vertical wall 174 of the upper housing 64 that separates the handles 65 from the upper housing.

A cam 176 is attached to the hinge 172 on the opposite side from the pad portion 168 and extends into the upper housing 64 so that a surface 178 of the cam 176 comes in sliding contact with the switch activation pin 162 of the switch 160. The cam surface 178 is configured so that when the cam is rotated downwardly, the pin 162 on the switch 162 becomes depressed from its projected position (best shown in FIG. 16). It should be noted that the vertical movement of the pad portion 168 in the upward direction is limited by inner upper surface 180 of the handles 65 (best shown in FIG. 14), and by the vertical wall 174 of the upper housing 64 at the handles in the download direction. As shown in FIG. 14, the vertical wall 174 at the handle 65 extends only partially from the upper housing 64, so as to allow the limited movement of the cam 176, and accordingly, the pad portion 168.

In operation, the pad portion 168 is pushed upwardly as shown by arrow B (best shown in FIG. 17) when a user grasps the bottom side 181 of the handles 65 to lift the power head 20 off the oven housing 18 (best shown in FIG. 2) or to move the entire oven 10 together (best shown in FIG. 1). Lifting of the handles 65 from the bottom side 181 exposes the pad portion 168 to the user's fingers and causes the lever mechanism 166 to pivot about the hinge 172, thereby rotating the cam 176 downwardly in the direction indicated by arrow C. and depressing the switch activation pin 162 of the switch 160 (best shown in FIG. 17). When the handles 65 are released by the user, the pad portion 168 returns to its original horizontal position (best shown in FIG. 16) by its own weight and by the outward spring force exerted by the pin 162 against the surface 178 of the cam 176.

Returning now to the FIG. 7, the power interrupt device 158 is operatively connected to the controller 100. When the power interrupt device 158 is activated by the user, the controller 100 interrupts power to the motor 76 and the heating element 84 until a start button provided on the control panel 106 is pressed again by the operator, at which point the controller restores power to the heating element 84 and the motor 76.

Figure 18:
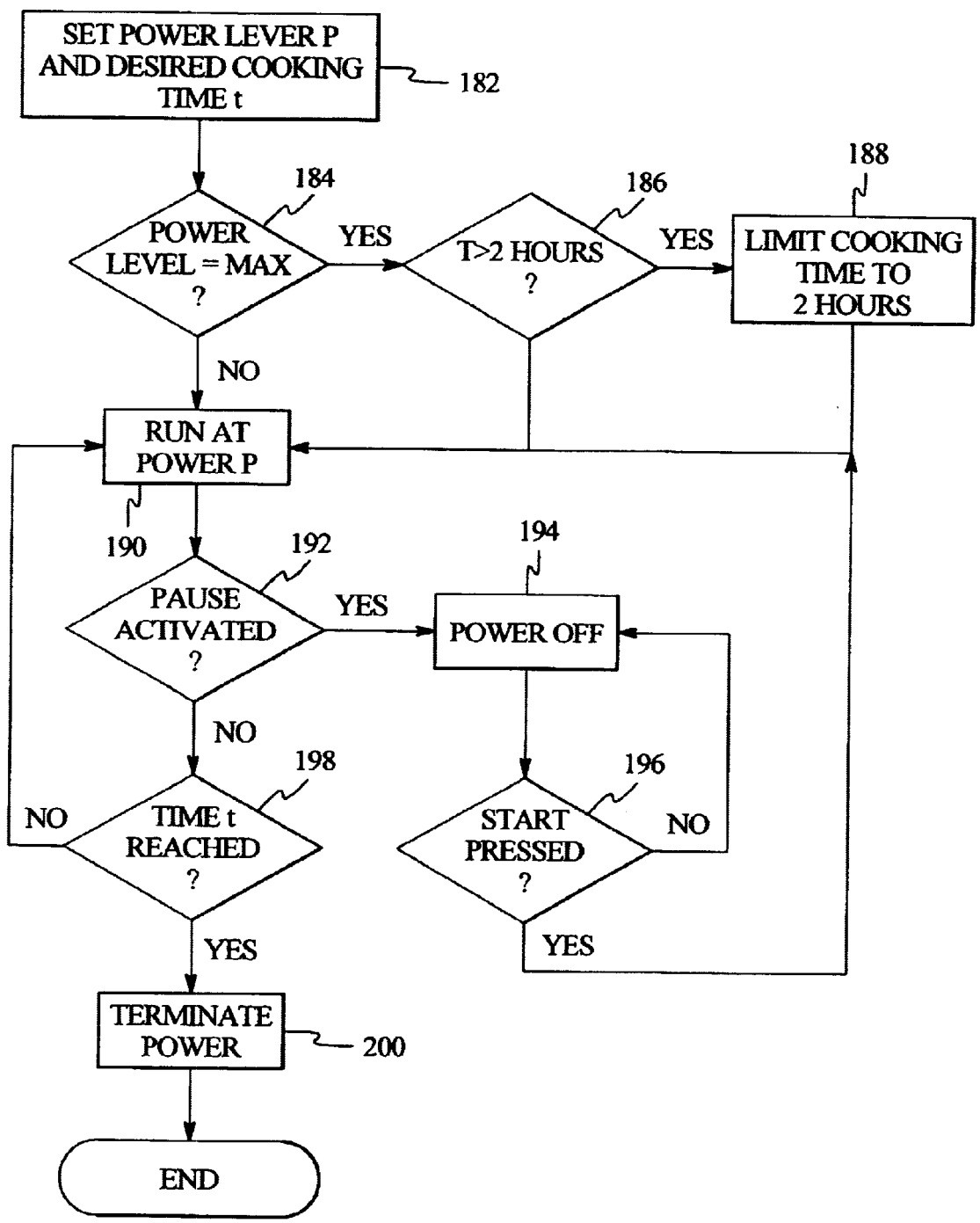
FIG. 18 is a flowchart illustrating the operation of the oven incorporating the power interrupt device.

The operation of the electric oven 10 incorporating the power interrupt device 158 is described with reference to FIG. 18. The operation of the oven 10 from blocks 182 to 188 is the same as in blocks 130–136 in FIG. 8 described above. At block 190, the oven 10 operates at power P set in block 182 regardless of the decisions made in blocks 182–188. If the power interrupt device 158 is activated while the oven is in operation (block 192), the controller 100 interrupts power to the heating element 84 and the motor 76 (block 194). If subsequently, the user restarts the oven 10 using the start button on the control board 106 (block 196), the oven resumes operation at the originally set power level P and the time left off prior to the power interruption (block 190). If, however, the oven 10 is not restarted by the user at block 196, the oven remains at the interrupted state.

If at block 192, the power interrupt device 158 has not been activated, then the controller 100 determines if the time limit t has been reached (whether set by the user or by the controller to 2 hours) (block 198). If the time limit has not been reached, the operation goes back to block 190 to continue operating at power P. If it has, power to the motor 76 and the heating element 84 is terminated by the controller 100 (block 200) and the operation comes to an end.

Figure 19:
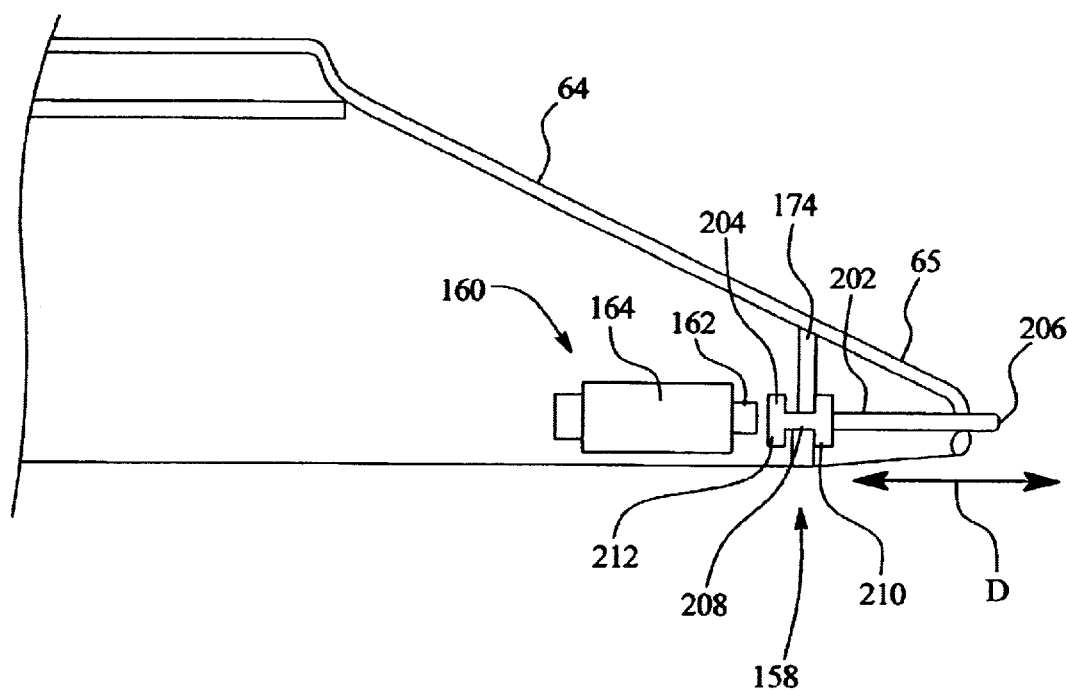
FIG. 19 is an alternative embodiment of the power interrupt device of FIG. 15.

Turning now to FIG. 19, and in accordance with another aspect of the present invention, the power interrupt device 158 includes a generally elongated arm 202 which is adapted to make contact with the switch activating pin 162 at its inside end 204 and protrude slightly from the handle 65 at its outside end 206. The arm 202 extends through a 208 hole in the vertical wall 174 of the upper housing 64 that separates the handles 65 from the upper housing, and has a pair of brackets 210, 212 provided one on each side of the vertical wall. The arm 202 is configured to move in radial directions as shown by an arrow D. It should be understood, that the brackets 210, 212 are larger than the hole 208 such that the distance of the arm's 202 movement is limited by the two brackets abutting against the vertical wall 174.

In operation, the switch activating pin 162 is depressed to interrupt power to the motor 76 and the heating element 84 when the arm 202 is pushed in the inward radial direction, as when a user grasps the handle 65. The arm 202 is pushed in the outward radial direction by the switch activating pin 162 when the user releases the handle 65.

From the foregoing description, it should be understood that an improved counter-top electric oven has been shown and described which has many desirable attributes and advantages. It includes a power interrupt device incorporated into the handle of the power head so that when the user attempts to remove the power head during operation, power to the heater and the motor is automatically interrupted as a safety measure. When the user restarts the oven, the oven operation is continued at the originally set power level for the time remaining left from the initially set time.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A counter-top electric oven, comprising:
   a base;
   an oven housing supported on said base;
   a power head detachably connected to said oven housing and including a heating unit for generating and directing heat into said oven housing;
   at least one handle formed on said power head; and,
   means for interrupting power to said power head operatively provided in said at least one handle,
   wherein said power interrupting means is activated when said at least one handle is grasped by a user.

2. The oven as defined in claim 1 wherein said power interrupting means includes a switch which is activated to interrupt power to said power head, and a lever pivotably attached to said at least one handle for activating said switch.

3. The oven as defined in claim 2 wherein said power interrupt switch is configured to be deactivated when the user releases grasp on said handle.

4. The oven as defined in claim 3 farther including a power switch for resuming power to said power head after said power interrupt switch has been deactivated.

5. The oven as defined in claim 2 where said lever includes a hinge portion which allows said lever to be pivoted about said hinge portion to a first position and a second position.

6. The oven as defined in claim 5 further including a cam attached to said hinge portion, said cam being configured such that said cam depresses a pin on said switch to activate said switch when said lever is pivoted to said second position.

7. The oven as defined in claim 6, wherein said lever is accessible to the user from a bottom side of said at least one handle, and said lever is pivoted to said second position when an upward force is applied to said lever the user's grasp.

8. The oven as defined in claim 1 wherein said power interrupting means includes a switch which is activated to interrupt power to said power head, and an elongated arm having a first end and a second end protruding from said handle and adapted to move in a longitudinal direction of said arm, further wherein said first end of said arm contacts said switch to activate said switch when the user depresses said second end by said grasping of said handle.

9. The oven as defined in claim 8 wherein said arm extends through a first hole in said handle and a second hole in a wall that separates said handle from said power head.

10. The oven as defined in claim 9 further including a pair of spaced brackets formed on said arm on opposite sides of said wall, and wherein said longitudinal movement of said arm is limited by a distance between said brackets.

11. A power head configured and adapted to be detachably attached to a cooking enclosure of an electric counter-top oven for generating and directing heat into the cooking enclosure, said power head comprising:
    a housing having a top side and a bottom side;
    a heating unit provided in said housing for generating and directing heat from said bottom side into the cooking enclosure;
    at least one handle formed on the housing for attaching and detaching said power head onto and from the cooking enclosure; and,
    means provided in said handle for interrupting power to said heating unit.

12. The oven as defined in claim 11 wherein said power interrupting means includes a switch which is activated to interrupt power to said power head, and a lever pivotably attached to said at least one handle for activating said switch.

13. The oven as defined in claim 12 wherein said power interrupt switch is configured to be deactivated when the user releases grasp of said handle.

14. The oven as defined in claim 13 further including a switch for resuming power to said power head after said power interrupt switch has been deactivated.

15. The oven as defined in claim 12 where said lever includes a hinge portion which allows said lever to be pivoted about said hinge portion to a first position and a second position.

16. The oven as defined in claim 15 further including a cam attached to said hinge portion, said cam being configured such that said cam depresses a pin on said switch to activate said switch when said lever is pivoted to said second position.

17. The oven as defined in claim 16, wherein said lever is accessible to the user from said bottom side of said at least one handle, and said lever is pivoted to said second position when an upward force is applied to said lever the user's grasp.

18. The oven as defined in claim 11 wherein said power interrupting means includes a switch which is activated to interrupt power to said power head, and an elongated arm having a first end and a second end protruding from said handle, and adapted to move in a longitudinal direction of said arm, further wherein said first end of said arm contacts said switch to activate said switch when the user depresses said second end by said grasping of said handle.

19. The oven as defined in claim 18 wherein said arm extends through a first hole in said handle and a second hole in a wall of said housing.

20. The oven as defined in claim 19 further including a pair of spaced brackets formed on said arm on opposite sides of said wall, and wherein said longitudinal movement of said arm is limited by a distance between said brackets.

* * * * *